June 10, 1930.  A. W. PETREY  1,762,738
FILTRATION APPARATUS
Filed June 7, 1929   3 Sheets-Sheet 1

WITNESSES
A. B. Wallace
F. B. Flick

INVENTOR
Arthur W. Petrey
by Brown & Critchlow
his attorneys.

June 10, 1930.                A. W. PETREY                1,762,738
                          FILTRATION APPARATUS
                    Filed June 7, 1929        3 Sheets-Sheet 2

Patented June 10, 1930

1,762,738

UNITED STATES PATENT OFFICE

ARTHUR W. PETREY, OF PARNASSUS, PENNSYLVANIA, ASSIGNOR TO ALUMINUM COMPANY OF AMERICA, OF PITTSBURGH, PENNSYLVANIA, A CORPORATION OF PENNSYLVANIA

FILTRATION APPARATUS

Application filed June 7, 1929. Serial No. 369,140.

This invention relates to filtration apparatus, and especially to laboratory apparatus for handling large numbers of individual samples.

The standard laboratory filtration procedure involves periodical addition of the liquid to be filtered to a filter arranged in a funnel, and subsequent washing of residue from the liquid container into the filter, and of the material retained by the filter, these washing operations being performed by means of a jet of wash liquid directed and moved manually over the areas to be washed. The operation requires constant supervision and numerous individual hand operations, and is accordingly tedious and time-consuming. The disadvantages are especially apparent where large numbers of individual samples are handled simultaneously, as in metallurgical control work.

An object of this invention is to provide a laboratory filtration unit which effects substantially automatic washing of the material retained by a filter, in the use of which a minimum number of hand operations is required, which is of simple construction, easily handled, and efficient and dependable in operation.

A further object is to provide an apparatus of this type which is adapted to handle a plurality of individual samples, in which the samples are automatically fed to the filters, the containers and filters are washed by automatic means under the control of the operator, and which reduces the amount of personal attention and labor involved in and facilitates the filtration of a multiplicity of samples.

Figure 1:
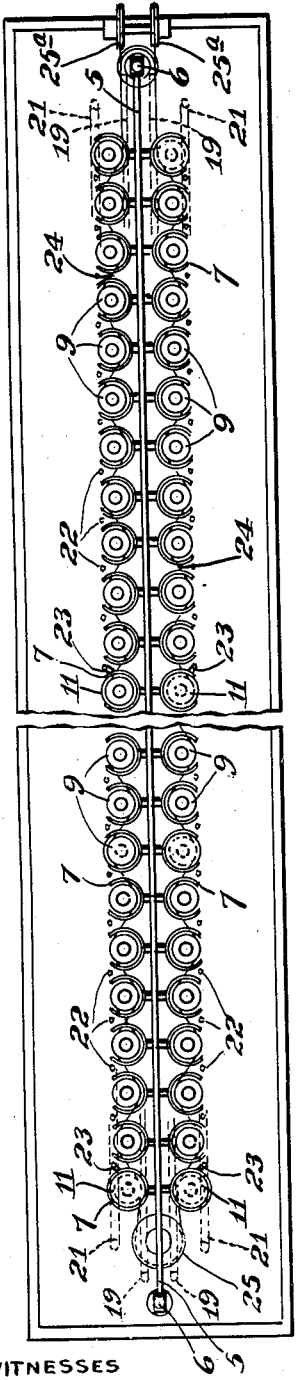
Figure 2:
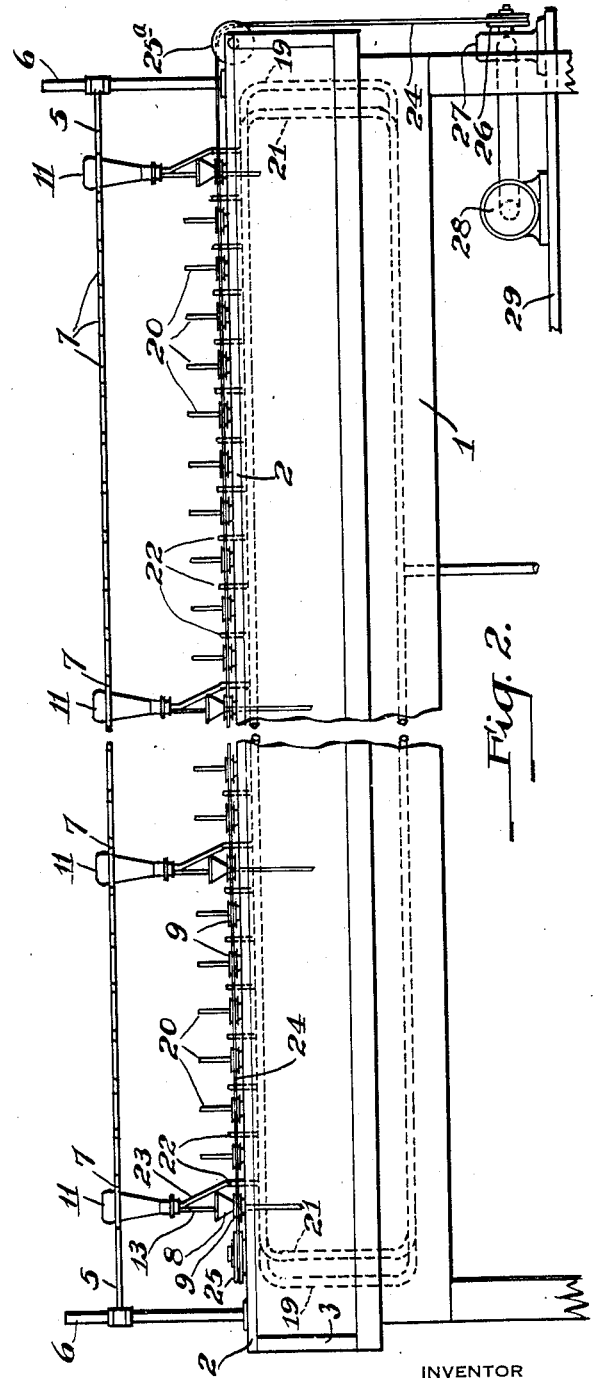
Figure 3:
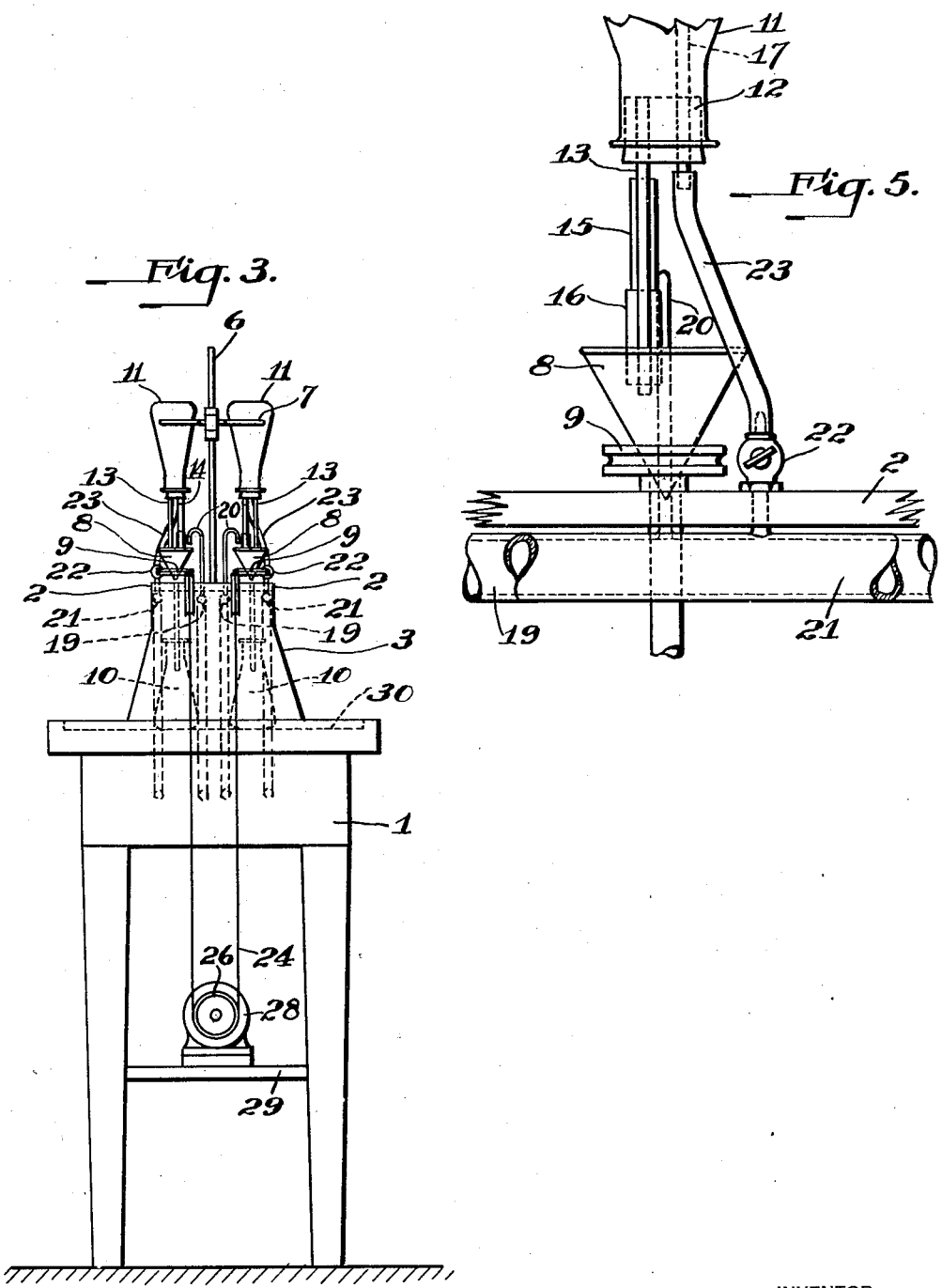
Figure 4:
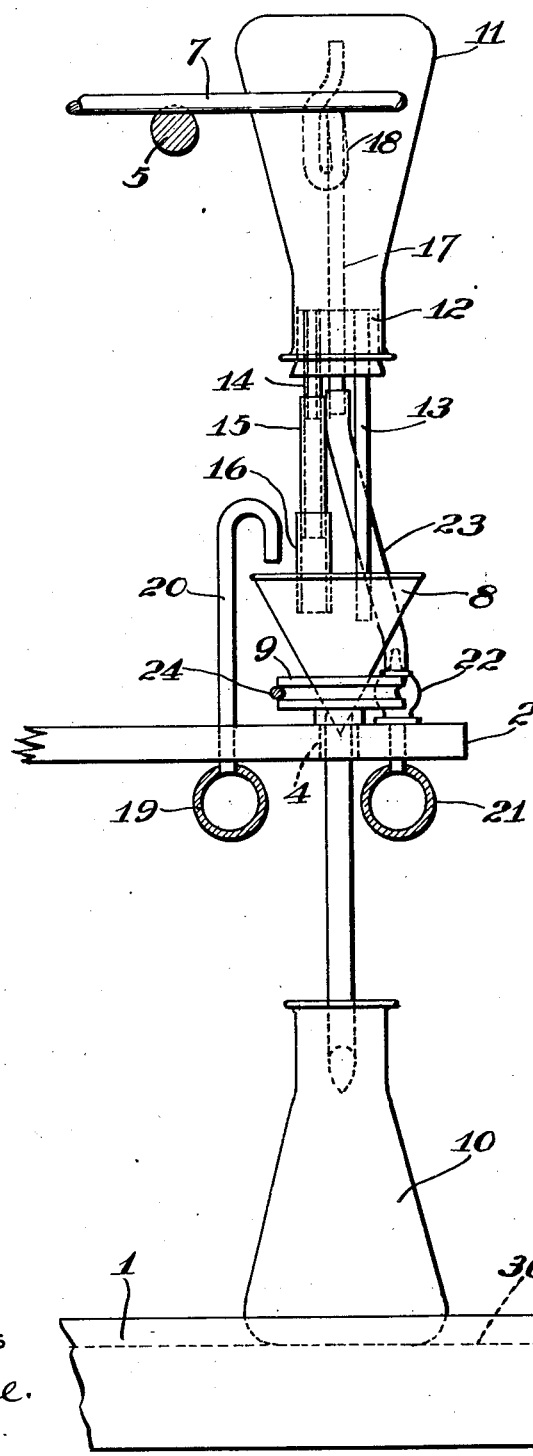

The preferred embodiment of the invention is shown in the accompanying drawings, in which Fig. 1 is a plan view, Fig. 2 a side elevation, and Fig. 3 an end view of an apparatus embodying a plurality of filtration units; Fig. 4 is an enlarged view of one of the individual filter units; and Fig. 5 is a fragmentary view from another position of the unit shown in Fig. 4.

The objects of the invention are obtained in part by the use of individual filter units comprising a rotatable funnel and means for directing a stationary jet of wash liquid into a filter arranged in the funnel. In the preferred embodiment the liquid to be filtered is supplied to the filter from a container mounted over the funnel, the container being preferably provided with flow-regulating means and with means for washing residue from the container into the funnel. Any suitable number of these units may be combined in a single apparatus, all of the funnels being simultaneously rotated by a single means, and wash liquid being distributed from a common source to the containers and the funnels. In this manner a large number of samples can be handled at the same time, all being washed simultaneously.

Having reference now to the drawings, the embodiment shown comprises a table 1 of any suitable construction, a funnel rack 2 supported above the table by brackets 3 and provided along each side with spaced openings 4 for receiving the stems of funnels, and a container rack formed by a horizontal rod 5 supported by and between vertical bars 6 connected to the ends of rack 2. Rod 5 carries a plurality of split rings 7 positioned vertically over openings 4.

As shown in Figs. 4 and 5, each filter unit comprises a funnel 8 supported in a grooved ball bearing spindle 9 on filter rack 2, the stem of the funnel passing through opening 4 and being inserted in a filtrate-receiving flask 10. The spindles are preferably constructed of wood, and a filter paper, not shown, is arranged in the usual manner in the bell of the funnel.

Liquid to be filtered is supplied to the filter from a container 11 mounted in an inverted position in split ring 7. This container, preferably an Erlenmeyer flask, is provided with a three-hole stopper 12. Liquid passes into the funnel through a delivery tube comprising a length of glass tubing 13 inserted in one of the holes in the stopper and extending downwardly into the bell of funnel 8. The upper end of this tube is flush with, or slightly below the plane of, the upper end of the stopper. A short section of glass tubing 14, disposed in another hole in the stopper, is connected by a section of rubber tubing 15 to a length of glass tubing 16 which extends into the bell of the funnel for regulating flow from the container. The lower ends of tubes 13 and 16 are adjusted to lie below the plane of the upper edge of the filter paper. The container is also provided with means for introducing a liquid to wash any solid and liquid residue from the container into the filter. In the form shown this comprises a glass tube 17 passing through the third hole in the stopper and bent near its upper end to form a trap portion 18, the discharge opening of the tube being situated close to the upper end of the container.

Conduits 19 supply a wash liquid, such as distilled water, to stationary spigots 20 arranged along funnel rack 2 in fixed relation to the funnels, as shown particularly in Fig. 4, and conduits 21 supply distilled water to pet cocks 22 situated at each station, these pet cocks being connected by rubber tubing 23 to the lower ends of tubes 17. The conduits 19 and 21 are connected to sources of wash liquid under pressure, such as distilled water heaters, not shown, disposed above the apparatus, control valves being arranged at any convenient point. These conduits may be connected to a single or to separate sources of wash liquid.

The funnels 8 are rotated by a belt 24 which passes alternately around the opposite sides of spindles 9 and over idler pulleys 25 and 25ª, the belt being driven by a pulley 26 connected through a suitable speed reducing mechanism 27 to a motor 28 mounted on a shelf 29 below the table top. Although the speed of rotation of the funnels may be varied according to the size of the funnels and the type of filtration, a speed of about 30 R. P. M. has been found suitable for most analytical work.

In the use of this apparatus, containers 11 are removed from split rings 7 which permit the containers to be slipped out laterally upon being raised slightly. The stoppers are then removed from the flasks and permitted to hang from connecting tube 23. The sample to be filtered is poured into the container and the stopper is replaced. Flask 10 and funnel 8 with its filter paper having been set in position, rubber tubing 15 is shut off by compression between the thumb and finger and the flask is then returned to its inverted position in split ring 7.

As long as tubing 15 is compressed, atmospheric pressure on delivery tube 13 prevents the liquid from flowing out of the container. When tubing 15 is released, air is admitted through the flow-regulating tube and liquid flows through tube 13 into the funnel until the liquid has risen to the level of the tube, when liquid no longer flows. As the liquid level in the filter falls due to drainage from the filter, air is again admitted to container 11, and liquid once more flows until the lower end of the tube is again immersed. In this manner automatic regulation of flow is obtained, and no attention is required.

When all of the liquid has drained from a container and has passed through the filter, pet cock 22 is opened, admitting distilled water into the container through tube 17. This stream of water strikes the uppermost end of the container and is distributed over the entire surface, flushing down all liquid and solid residue. The purpose of the trap portion of this tube is to retain the particles which settle into the tube when the filled container is inverted. When cocks 22 are opened, the rush of water readily forces these particles out, and they then pass into the filter.

After all of the containers have been flushed and the wash liquid has drained from them and from the filters, motor 28 is started to rotate the funnels, a valve in conduits 19 being then opened to admit distilled water to spigots 20, each of which then plays a stationary jet of wash water on the contents of the filter rotating beneath it. When the filters are full the valves are closed and the funnels are allowed to drain, they being preferably rotated continuously during the washing operation. This washing operation may be repeated as often as need be.

It will be seen that this procedure eliminates the prior wash bottle mode of flushing the liquid containers and washing the contents of the filter, and substantially reduces the amount of labor required. The feeding of liquid is automatic, flushing of the containers merely requiring a pet cock to be turned, all of the filters being simultaneously washed automatically. This reduces very substantially the time and labor involved, and makes it possible for a staff of a given size to handle a much greater volume of analyses than possible under prior manual procedure.

The flushing operation in general completely sweeps out residual matter from the containers. However, where it does not, the container may be removed, the adherent matter lossened from the walls by scrubbing in the usual manner with a "policeman," and the flask returned, stoppered and again flushed.

If desired, the upper surface of the table may be provided with a drain surface, indicated at 30, Figs. 3 and 4. Also, it is preferred to construct the conduits and other fittings, so far as possible, from aluminum, because this metal is resistant to the corrosive action of the laboratory atmosphere, and for general laboratory work is a good substitute for the block tin pipe customarily used in distilled water lines.

According to the provisions of the patent statutes, I have explained the principle and operation of my invention, and have illustrated and described what I now consider to represent its best embodiment. However, I desire to have it understood that, within the scope of the appended claims, the invention may be practiced otherwise than as specifically illustrated and described.

I claim:

1. A filtration apparatus comprising a funnel support, a funnel rotatably carried by said support, means for rotating the funnel, and filter-washing means disposed in fixed relation to the funnel and adapted to be connected to a source of wash liquid.

2. A filtration apparatus comprising a funnel support, a funnel rotatably carried by said support, means for rotating the funnel, means mounted above the funnel for delivering to it a liquid to be filtered, and stationary filter-washing means disposed in fixed relation to the funnel and adapted to be connected to a source of wash liquid.

3. A filtration apparatus comprising a funnel support, a funnel rotatably carried by said support, means for rotating the funnel, a container mounted above the funnel for delivering to it a liquid to be filtered, means associated with said container for washing residue from the container into the funnel, and stationary means disposed in fixed relation to the funnel for directing a stream of wash water into the funnel.

4. A filtration apparatus comprising a rack, a plurality of filtration units each including a funnel rotatably carried by said rack, and stationary means disposed in fixed relation to each funnel for directing streams of wash liquid into the funnels, and means for rotating the funnels.

5. A filtration apparatus comprising a rack, a plurality of filtration units each including a funnel rotatably carried by said rack, means disposed in fixed relation to each funnel for directing a stream of wash liquid into it, and a container for liquid to be filtered supported over each funnel and provided with means for regulating flow from the container and with means for washing a residue from the container into the funnel, and means for rotating all of the funnels simultaneously.

6. A filtration apparatus comprising a rack, a plurality of funnels rotatably supported at spaced intervals in said rack, means for rotating said funnels simultaneously, means disposed in fixed relation to each of said funnels for directing wash liquid into it, and a container for liquid to be filtered removably mounted above each of the funnels and provided with a flow regulated discharge tube leading to the funnel and with a tube for introducing a wash liquid into the container.

7. A filtration apparatus comprising a table, lower and upper racks carried by said table, a plurality of funnels rotatably carried in said lower rack, means associated with the table for rotating all of the funnels, means disposed in fixed relation to each funnel for directing a stream of wash liquid into it, connections between said filter-washing means and a source of wash liquid under pressure, and containers for liquid to be filtered removably disposed in said upper rack one over each of said funnels, each of said containers comprising an inverted flask having its stopper provided with a delivery tube leading to the funnel, a flow-regulating tube extending into the funnel, and a container-washing tube connected to a source of wash liquid and extending toward the uppermost part of the container.

8. In a filtration apparatus, the combination of a rotatable funnel, means for directing a stream of wash liquid into the funnel, a container for liquid to be filtered disposed above said funnel and provided with a tube for delivering liquid to the funnel, means for regulating flow of liquid from the container, and means for washing residue from the container consisting of a tube connected to a source of wash liquid and extending toward the uppermost part of the container, said tube having a particle-retaining trap adjacent its discharge end.

In testimony whereof, I sign my name.

ARTHUR W. PETREY.